United States Patent [19]

Swanson

[11] Patent Number: 4,887,281

[45] Date of Patent: * Dec. 12, 1989

[54] RECREATION VEHICLE DISTANCE MEASURING DEVICE

[76] Inventor: Carl S. Swanson, P.O. Box 4251, Brownsville, Tex. 78523

[*] Notice: The portion of the term of this patent subsequent to Feb. 21, 2006 has been disclaimed.

[21] Appl. No.: 180,428

[22] Filed: Apr. 11, 1988

Related U.S. Application Data

[63] Continuation-in-part of Ser. No. 92,866, Sep. 3, 1987, Pat. No. 4,807,265.

[51] Int. Cl.$^4$ ................................................. G01C 22/00
[52] U.S. Cl. .................................. 377/24.1; 377/24.2; 377/32
[58] Field of Search .......................... 377/24.1, 24.2, 32

[56] References Cited

U.S. PATENT DOCUMENTS

| | | | |
|---|---|---|---|
| 3,571,933 | 3/1971 | Johnson | 377/24.2 |
| 4,044,471 | 8/1977 | Peterson | 377/24.2 |
| 4,053,749 | 10/1977 | Shinoda et al. | 377/24.1 |
| 4,053,755 | 10/1977 | Sherrill | 377/24.2 |
| 4,188,529 | 2/1980 | Schochat et al. | 377/24.1 |
| 4,250,402 | 2/1981 | Mizote et al. | 377/24.1 |
| 4,480,310 | 10/1984 | Alvarez | 377/24.2 |
| 4,532,710 | 8/1985 | Kinney et al. | 377/24.1 |
| 4,807,265 | 2/1989 | Swanson | 377/32 |

Primary Examiner—John S. Heyman
Attorney, Agent, or Firm—Diller, Ramik & Wight

[57] ABSTRACT

A distance measuring device that can be easily retrofit to a recreational vehicle includes a sensor unit that easily attaches to the wheel of the vehicle, a counter unit 12 for processing the sensor signals, a display unit 13 for providing a numeric display of the distance traveled, a reset unit 14 for allowing the vehicle operator to reset the count to zero and to initiate a timing cycle, during which timing cycle movement of the vehicle must either start or continue, and a time limit unit 16 for automatically resetting the timing cycle to lengthen the cycle under appropriate circumstances. The timing cycle will terminate when no sensor signals are received during the timing cycle, and as a result, the counting circuits and the sensor will be driven low to clear memory and preserve power. In the new embodiment, a display present unit 50 can be used to cause a predetermined count to be displayed on the display unit 13. An increment/decrement select unit unit 51 can then be used to cause the display to decrement from the predetermined count.

3 Claims, 3 Drawing Sheets

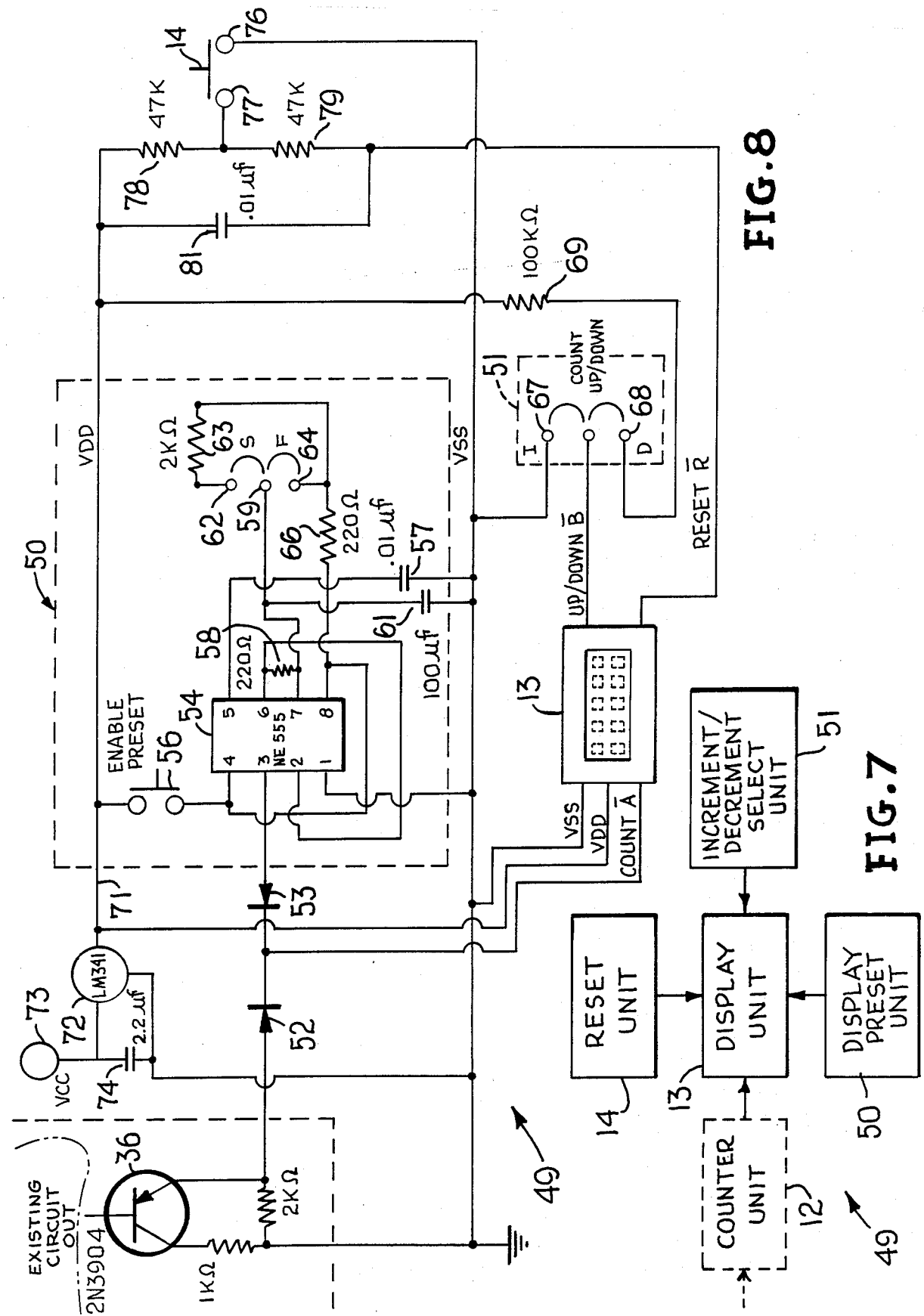

RECREATION VEHICLE DISTANCE MEASURING DEVICE

CROSS-REFERENCE TO RELATED APPLICATION

This application is a continuation-in-part application of Ser. No. 07/092,866 filed Sept. 3, 1987 in the name of Carl S. Swanson, and now U.S. Pat. No. 4,807,265.

TECHNICAL FIELD

This invention relates generally to distance measuring devices for use with vehicles having ground contacting rotating wheels, and particularly to electric distance measuring devices.

BACKGROUND OF THE INVENTION

Vehicles such as automobiles and trucks ordinarily include an odometer to indicate total mileage that has been traveled by the vehicle over its lifetime. Many such vehicles also include a secondary odometer known as a trip odometer. The trip odometer functions similarly to the primary odometer mentioned above, but may be reset to zero by the driver as so desired. As a result, a driver in such a vehicle can readily determine the distance from one place to another by proper manipulation of the trip odometer.

Not all vehicles are equipped with such a distance measuring device, however. In particular, many recreation vehicles, such as golf carts, provide only rudimentary transportion of passengers and related cargo. Nevertheless, many recreational activities that make use of such recreational vehicles can make valuable use of distance information to the extent that it can be provided. Generally, however, participants of such activities must rely on their ability to estimate distances by sight, on distance indicating markers, or on some portable means of roughly estimating distance, such as a pedometer. (The latter, of course, defeating much of the purpose of utilizing a golf cart or other recreational vehicle.)

Also, the prior art mechanisms described the above function only to measure the distance a particular vehicle travels from an original starting point. In many recreational applications, the user wishes instead to understand how much further his vehicle must travel to reach a particular ending location. For example, a golfer may wish to know, without making independent calculations, his distance from a particular hole. The above-noted prior art devices cannot provide this information.

There, therefore, exits a need for a distance measuring device that can be compatibly utilized with recreational vehicles. Since many such vehicles are already in existence, the device in question should be relatively easily retrofitted into existing vehicles in as unobtrusive and nondestructive a way as possible. Further, such a device must be simple to operate, relatively accurate, and sensitive to the limited on-board support capabilities of many recreational vehicles.

SUMMARY OF THE INVENTION

The above needs and others are substantially met through provision of the recreation vehicle mounted distance measuring device disclosed herein. This device operates in conjunction with a vehicle having at least one ground contacting rotating wheel (for propulsion, steering or support purposes), and includes a sensor unit, a counter unit, a display unit, a reset unit, and a time limit unit.

The sensor unit can include magnets that are mounted to rotate with the above-noted wheel, and a magnetic field responsive sensor (such as a Hall effect sensor) that is substantially nonrotatably mounted proximal to the wheel, such that rotation of the wheel will periodically bring the magnets sufficiently close to the sensor to allow the sensor to sense such proximity. The sensor provides an electrical signal comprising a sensor signal in response to sensing each magnetic disturbance. In the embodiment described below, two magnets are mounted to rotate with the wheel, and, hence, the sensor will provide two sensor signals for each rotation of the wheel. The entire sensor unit, including the sensor and the magnets, can be comprised of a quickly and easily nonpermanently mountable structure, or can be permanently mounted, if so desired.

The counter unit receives the sensor signals and maintains a count thereof. Through appropriate construction of the counter unit in view of the dimensions of the wheel being monitored, such a count can be used to provide an accurate indication of the distance traveled by the wheel, and, hence, the recreational vehicle associated therewith.

The display unit connects to the counter unit and provides a visible display of the count as converted into the desired units, such as feet, meters, yards, or the like. The display unit has associated therewith the reset unit, which allows the display and the count to be reset to zero and power to be applied to relevant circuitry through a bias network and timer such that a new distance can be measured.

The time limit unit responds to both the sensor signals and the reset unit. In effect, the time limit unit monitors for sufficient activity to justify maintaining the count and display operation. The latter activities of the device consume power, and since the device must often be powered by self-contained batteries, power consumption must be carefully monitored. Therefore, if a sensor signal fails to appear within a predetermined period of time following receipt of a last-received sensor signal, the time limit unit will cause an associated timer to turn off appropriate related circuitry. The time limit unit responds to the reset unit to also cause the timer to reset so that the counting process can resume anew whenever the reset unit is activated by the operator of the vehicle.

In another embodiment, the device can alternatively be provided with a display preset unit and an increment/decrement select unit. The display preset unit can be used to cause a preselected distance to be displayed by the display unit. The increment/decrement unit can then be used to cause the display to decrement as the vehicle moves, instead of incrementing. To facilitate this process, the display preset unit can increment the display to a desired amount at either of two selected speeds; fast and slow. The fast speed can be used to cause the display unit to quickly display an amount in the approximate range of the desired amount, and the slow speed can then be used to cause the display unit to increment more slowly to the precise desired distance.

Through provision of this device, a distance measuring device can be reaily incorporated into existing recreational vehicles that provides accurate measuring capabilities, that is simple and reliable in use, and that is inexpensive to manufacture, install, and operate.

BRIEF DESCRIPTION OF THE DRAWINGS

These and other attributes of the invention will become more clear upon making a thorough review and study of the following description of the best mode for carrying out the invention, wherein:

FIG. 7 comprises a block diagram view of an alternative embodiment of the invention; and FIG. 8 comprises a schematic diagram of an alternative embodiment of the invention.

BEST MODE FOR CARRYING OUT THE INVENTION

Figure 5:
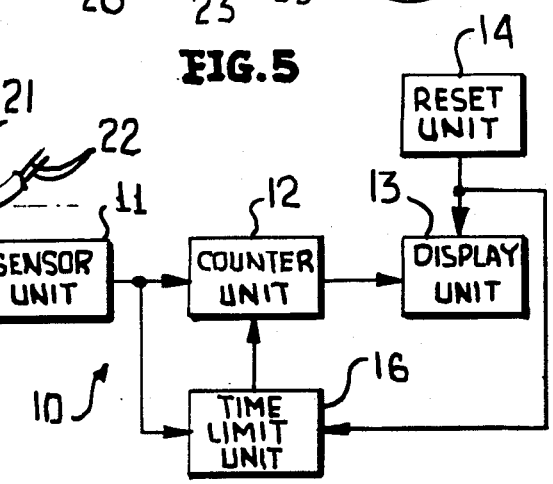
FIG. 5 comprises a block diagram view of the invention.

Referring now to the drawings, and in particular to FIG. 5, the invention can be seen as depicted generally by the numeral 10. The invention 10 includes generally a sensor unit 11, a counter unit 12, a display unit 13, a reset unit 14, and a time limit unit 16 Each of the above generally referred to components will now be described in more detail in seriatim fashion.

Figure 3:
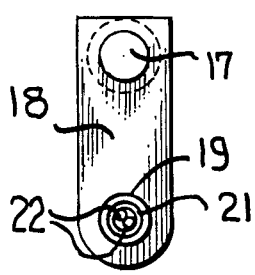
FIG. 3 comprises a front elevational view of the sensor mounting arm.
Figure 4:
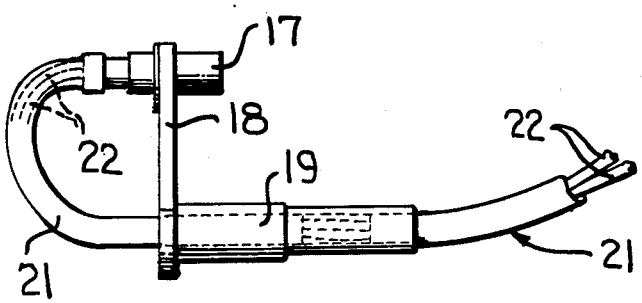
FIG. 4 comprises a side elevational view of the sensor mounting arm.

With reference to FIGS. 3 and 4, the sensor unit 11 includes a sensor 17 (for example, a Hall effect sensor such as the Sprague 3020), a mounting arm 18, an axle 19, and a conduit 21. The axle 19 affixes to the mounting arm 18 and has a cavity formed therethrough to receive the conducting wires 22 of the sensor 17. The sensor 17 itself can be mounted through a hole provided therefore at one end of the mounting arm 18. The conduit 21 comprises a casing of plastic tube or the like for encasing the conducting wires 22 and for providing sufficient stability to the mounting arm 18 to prevent it from turning.

Figure 2:
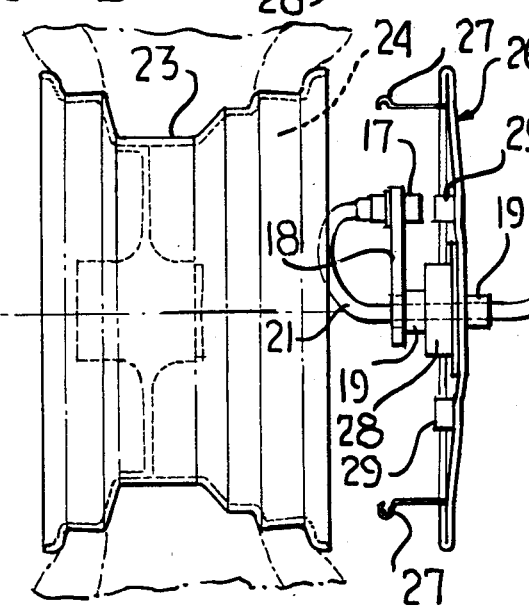
FIG. 2 comprises a detailed side elevational view of the sensor unit in conjunction with a wheel from the vehicle.

With reference to FIG. 2, a tire supporting wheel as associated with a recreation vehicle can be seen in part as depicted by the numeral 23. The wheel 23 includes a cavity 24 formed therein in accordance with well understood prior art technique.

With continued reference to FIG. 2, the sensor unit can be seen as generally depicted by the numeral 11. The sensor unit 11 includes a circular shaped plate 26 having clips 27 formed about the inside periphery thereof (only two clips 27 are shown for the purpose of clarity). So configured, the plate 26 can be moved into close proximity with the wheel 23, and the clips 27 will interact with the interior surfaces of the wheel 23 to cause the plate 26 to be nonpermanently affixed thereto. So mounted, the plate 26 will rotate as the wheel 23 rotates.

The plate 26 has a hole centrally disposed therethrough, and a bearing 28 mounted in close proximity to the hole such that the axle 19 of the sensor mounting arm 18 structure can be rotatably disposed therethrough. Finally, magnets 29 are mounted on the inside surface of the plate 26. For a golf bag carrier 30 as depicted in FIG. 1b, only two magnets 29, positioned 180 degrees apart, need be used. For a powered golf cart as depicted in FIG. 1b, three magnets 29 positioned 120 degrees apart should be used, to accommodate the difference in wheel circumference. (The former having a typical circumference of 43.9 inches and the latter having a typical circumference of 54 inches.) In the alternative, the magnets 29 may be mounted on the wheel 23 rim, in much the same way as wheel-balancing weights are attached to wheel rims. In either event, the magnets 29 are preferably mounted such that they will pass close to the sensor 17 when rotation of the plate 26 occurs.

With continued reference to FIG. 2, as the wheel 23 on the recreational vehicle turns, so also turns the plate 26 and the magnets 29 mounted thereon. The sensor 17, however, tends to remain in substantially one location (with respect to the axis of rotation), since rotation of the plate 26 does not cause commensurate rotation of the sensor mounting arm 18 structure, and the conduit 21 tends to cause the sensor 17 to remain stationary as depicted. Therefore, as the wheel 23 rotates, the magnets 29 will move past the sensor 17 in periodic fashion. This occasion al proximity will be sensed by the sensor 17, and sensor signals will be carried by the conducting wires 22 provided to the remainder of the invention as set forth below.

Figure 1A:
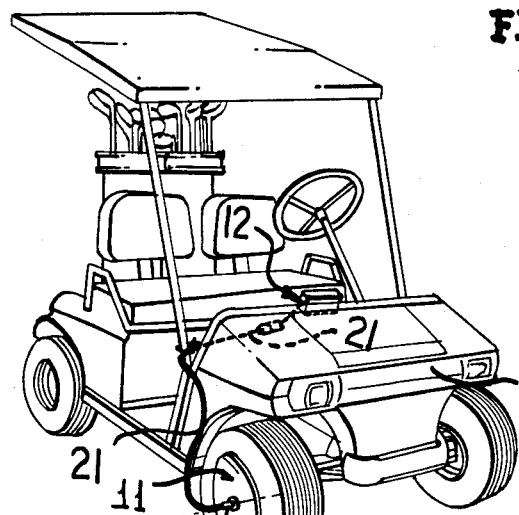
FIG. 1a comprises a perspective view of a recreational vehicle equipped with the invention.
Figure 1B:
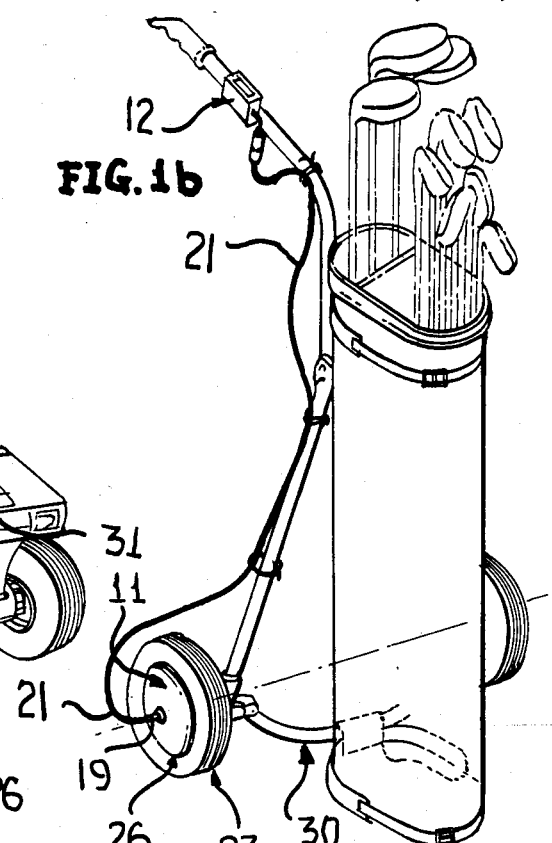
FIG. 1b comprises a perspective view of a golf bag carrier equipped with the invention.

With reference to FIG. 1a, it can be seen that the sensor unit can be readily and easily mounted to a recreational vehicle 31, such as a golf cart, or even to a golf bag carrier 30, as shown in FIG. 1b.

Figure 6:
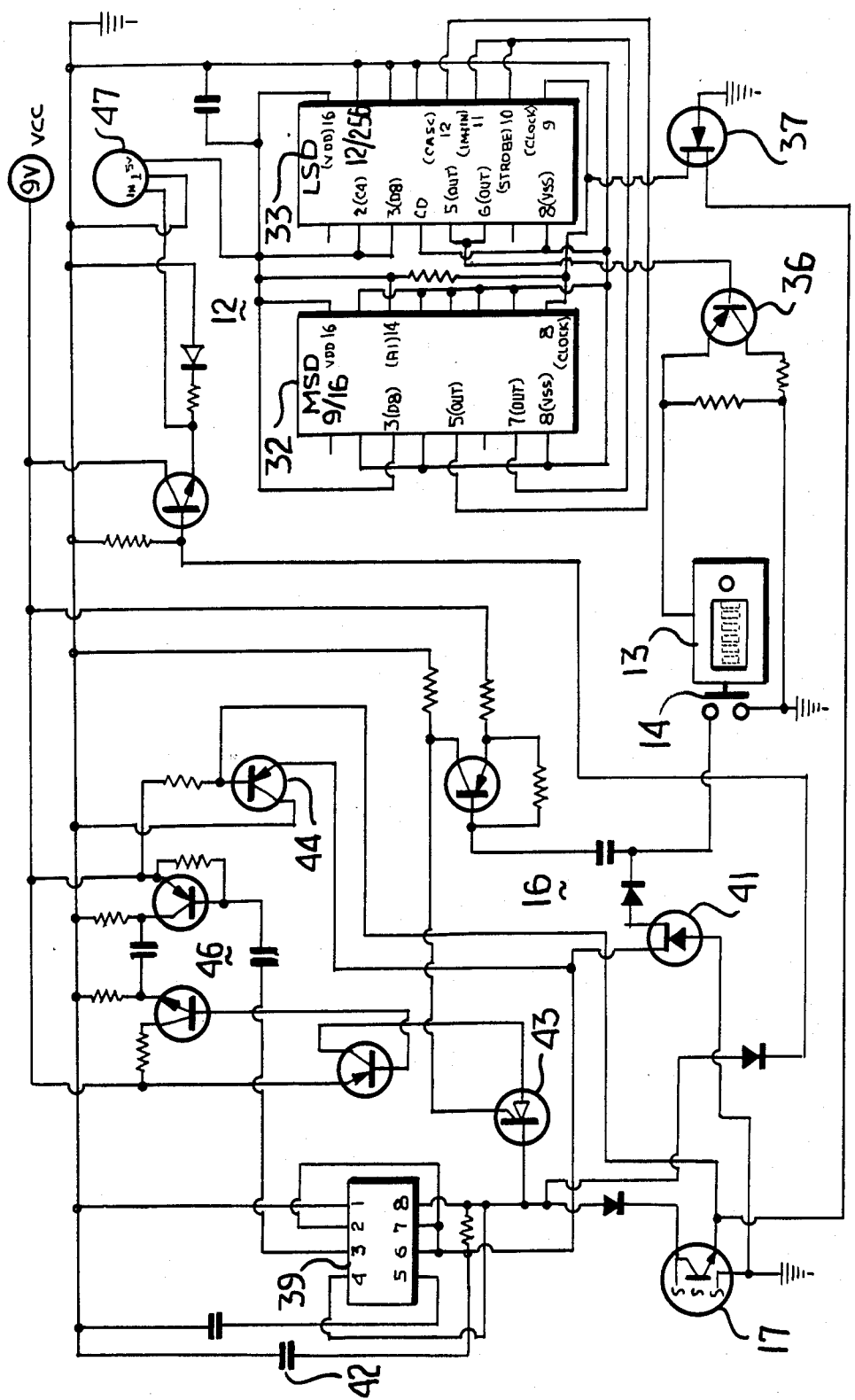
FIG. 6 comprises a schematic diagram of the invention.

Referring now to FIG. 6, the counter unit 12, the display unit 13, the reset unit 14, and the time limit unit 16 will now be described in detail.

The display unit 13 can be provided through use of a CUB 3 miniature electronic counter as manufactured by Red Lion Controls of York, Pa. Such a display provides a six digit seven-segment display well suited to displaying the distance information contemplated by this device 10. This counter also includes an operator accessible reset switch to allow the display to be reset to zero, which switch comprises a part of the reset unit 14 for this invention. In addition, this counter includes a minor modification to allow closure of the reset switch to also provide a reset signal external to the counter for purposes disclosed in more detail below.

The counter unit 12 (FIG. 6) includes two CD 4089 BCN's 32, 33 cascaded in the add mode. Presuming a fourteen inch wheel 23 on the recreational vehicle 31 (which comprises a standard sized wheel on a hand-pulled golf bag carrier), the BCN's 32, 33 can be configured to provide an internal-most significant digit (MSD) of 9/16 (0.5625) and a least significant digit (LSD) of 12/256 (0.046875) for a sum total of 156/256 (0.609375) per triggering event. This compares favorably with the 0.6107 yards that the vehicle 30 will traverse with each one-half rotation of the wheel 23. Each full rotation of the wheel 23 will, therefore, count as 1.2188, which approximates 1.22 yards. The BCN's 32, 33 will provide a pulse to the display unit 13 each time the count equals or exceeds one, with the remainder being retained in memory to be added with the next incoming count information.

For example, after one revolution (equaling about 1.22 yards of travel), a count pulse will be provided to the display unit 13 (such that the display unit 13 will display "1") and a remainder of 0.22 will be left in the counter unit 12. With the next revolution of the wheel 23, the display unit 13 will indicate "2" and a remainder of 0.44 will await further processing. This process will continue until the remainder exceeds "1", at which time the remainder will also contribute a count pulse to the display unit 13. For instance, after five revolutions of the wheel 23, a remainder of 0.10 will exist and the display unit 13 will indicate a count of "6".

The BCN's 32, 33 are configured as depicted in a relatively straightforward fashion to accomplish the above desired results. In addition, the following components may be used to complete the circuit. A 5 volt regulator 47 for local voltage regulation of the BCN's 32, 33 can protect operation of the BCN's against varying battery voltages. A field effect transistor 37 can be provided to serve as an isolating switch for the clock ports (pin 9) of the BCN's to bias and isolate the input from a reset transistor 44, and a properly biased transistor 36 can be used to increase the bias of the outputs ports (pins 5 and 6) of the second BCN 33. These components accommodate the input requirements of the display unit 13. In addition, a 100K Ohm pull-up resistor 38 can be provided for the clock port (pin 9) of both BCN's 32, 33 to enhance the output of the sensor 17.

The remainder of the circuit depicted in FIG. 6 essentially comprises the time limit unit 16. This unit 16 includes a 555 timer 39 configured to provide a reset pulse to itself to extend the duration of the timing cycle as long as there is activity (i.e., movement of the monitored vehicle). When the activity stops, the timer 39 will allow continued provision of power to the count circuits for a short time (such as five minutes), which relates to an acceptable period of time to allow a player to execute his next shot, presuming he might be delayed by a lost ball or the like. Should additional distance measurement be desired during this time period, movement of the vehicle will allow additional incrementation of the count and automatic timer reset to allow an additional extension of the timing cycle without first resetting the count.

Triggering (resetting) of the timer 39 occurs through appropriate switching a trigger transister 44, which can be triggered by either a reset signal from the reset unit 14 (as properly biased through a biasing network 44, or by receipt of a sensor signal from the sensor 17. Once triggered, an SCR 43 switches on and provides power until the timing process terminates. The timing cycle will continue until a 220 microfarad capacitor 42 operably connected to the threshold port (pin 6) of the timer 39 rises in potential sufficient to conclude the timing function.

The reset signal from the reset unit 14 also causes a FET 41 to ground the above noted capacitor 42 which in turn causes the timer 39 to reset itself and thereby extend the time cycle, which extensions will repeat in a similar manner until the pulses stop. Thus, the timer 39 is caused to reset itself without causing the BCN's 32,33 to similarly reset (and thereby cause the count to be reset) through appropriate processing of sensor signals.

Configured as depicted, the memory of BCN's 32, 33 will (presuming that timer 39 has timed out) automatically be cleared by the absence of current and the new count will be initiated by a new first sensor pulse, which pulse will also trigger the timer 39. Presuming receipt of a second sensor signal before the timer 39 times out, the BCN's will then continue the counting process described above.

Referring now to FIG. 7, an alternative embodiment will be described. In this embodiment, depicted generally by the numeral 49, the output of the counter unit 12 connects to the display unit 13, which again can be cleared through provision of an appropriate reset unit 14. In this embodiment, however, the display unit 13 can also be controlled through provision of a display preset unit 50 and an increment/decrement select unit 51. Each of the above generally referred to components will now be described in more detail.

With reference to FIG. 8, the output transistor 36 for the counter unit 12 connects through a first diode 52 to the appropriate count increment port of the display unit 13 as referred to above. The count increment port of the counter unit 13 also connects through a second diode 53 to the output of the display preset unit 50.

The display preset unit 50 comprises generally a 555 timer 54. The ground port (pin 1) of the timer 54 connects to ground, the trigger port (pin 2) connects to the threshold port (pin 6), and the output port (pin 3) connects through the second diode 53, as described above to the display unit 13. The reset port (pin 4) connects to an enable preset switch 56, which switch 56 also connects to the VDD port (pin 8). The control voltage port (pin 5) connects through a 0.01 micro farad capacitor 57 to ground, and the discharge port (pin 7) connects through a 220 ohm resistor 58 to pin 6, to the center pole of the preset switch 59, and through a 100 microfarad capacitor 61 to ground.

The present switch 59 includes two switches (S and F) to allow selection of fast or slow display incrementing. The slow switch pole 62 connects through a 2K ohm resistor 63 to the fast switch pole 64, and the fast switch pole 64 connects through a 220 ohm resistor 66 to VDD of the timer 54.

So configured, the timer 54 can be caused to provide output pulses to the counter unit 13 at either of two rates, depending upon whether the fast or slow switch (F or S) is used. Through use of these switches, the display unit 13 can be incremented to any desired preselected amount, such as the initial distance from a golf tee to its corresponding hole or green.

The display unit 13 also has an up/down port that connects to the increment/decrement select unit 51 The increment/decrement select unit 51 includes an increment switch I and a decrement switch D. The increment switch I has a pole 67 that connects to ground, and the decrement switch D has a pole 68 that connects through a 100K ohm resistor 69 to a voltage supply line 71 described in more detail below.

So configured, the display unit 13 can be placed in either an increment mode or a decrement mode. In the increment mode, pulses to the display unit 13 will cause the display to increment as described above. In the decrement mode, pulses to the display unit 13 will cause the display to decrement. The decrement mode, therefore, allows the display unit 13 to count down from a preselected displayed distance as preset through use of the display preset unit 50.

This embodiment 49 also includes a voltage regulator 72 such as an LM341, that connects to a 14 volt battery supply 73 provided on the monitored vehicle or the 9 volt battery shown in FIG. 6. This circuit also includes a 2.2 microfarad capacitor 74 connected between the battery supply 73 and ground to reduce the effect of electrical transients.

Lastly, this embodiment 49 provides a reset switch 14, with one pole 76 connected to ground and the remaining pole 77 connected to a voltage divider comprised of two 47K ohm resistors 78, 79 that are biased between the supply line 71 and the reset port of the display unit 13. A 0.01 microfarad capacitor 81 also connects in parallel with the voltage divider resistors 78, 79.

This embodiment 49 provides a number of important advantages and features. A user can either measure distance that is traveled from an initial starting point, or the distance that yet remains to be traveled to a final ending point. This embodiment also allows a user to preselect a distance to be traveled in both a fast mode and a slow mode.

Those skilled in the art will appreciate that various modifications could be made as regards the above described embodiments without departing from the spirit of the invention. It should, therefore, be understood that the invention is not to be considered as being limited to the precise embodiment set forth in the absence of explicit limitations directed to such features in the claims.

I claim:

1. A battery operated, distance measuring device for use with a recreation vehicle having a plurality of ground contacting rotating wheels, said device comprising:
   (a) sensor means for sensing rotation of at least one of said wheels and for producing sensor signals in response thereto;
   (b) counter means for responding to said sensor signals by incrementing a count related to rotation of said at least one wheel corresponding to a preselected standard distance measuring unit, and hence distance moved by said recreation vehicle;
   (c) display means for displaying at least a portion of said count;
   (d) reset means operable by an operator of said vehicle for causing said display means and said counter means to reset;
   (e) time limit means interconnecting said counter means with said battery and responsive to said sensor signals for allowing said count to be incremented so long as next received sensor signal occurs with a predetermined period of time with respect to a last received sensor signal;
   (f) display preset means for allowing a predetermined count to be initially displayed on said display means; and
   (g) decrement select means for causing said display means to decrement said predetermined count in response to said counter means.

2. The distance measuring device of claim 1 wherein said display preset means includes:
   (a) first switch means for causing said display preset means to increment to said predetermined count at a first rate; and
   (b) second switch means for causing said display preset means to increment to said predetermined count at a second rate, which second rate is slower than said first rate.

3. A distance measuring device for use with a recreation vehicle having a plurality of ground contacting rotating wheels, said device comprising:
   (a) sensor means for sensing rotation of at least one of said wheels and for producing sensor signals in response thereto;
   (b) counter means for responding to said sensor signals by providing a count related to rotation of said at least one wheel, and hence distance moved by said recreation vehicle;
   (c) display means for displaying a count;
   (d) display preset means for allowing a predetermined count to be initially displayed on said display means;
   (e) increment/decrement select means for causing said display means to selectively either;
      (i) increment said displayed count in response to said counter means;
      (ii) decrement said displayed count in response to said counter means;
   (f) said present means includes first switch means for causing said display preset means to increment to said predetermined count at a first rate; and
   (g) second switch means for causing said display preset means to increment to said predetermined count at a second rate, which second rate is slower than said first rate.

* * * * *